United States Patent [19]

Kuhn et al.

[11] 3,717,953
[45] Feb. 27, 1973

[54] APPARATUS FOR CULTIVATING PLANTS

[76] Inventors: Jorg Kuhn, Alpsteinstrasse 56, Herisau, Sweden; Elmar Sohm, Voralberg, Lauterach, Austria

[22] Filed: Nov. 10, 1971

[21] Appl. No.: 197,432

Related U.S. Application Data

[63] Continuation-in-part of Ser. No. 4,918, Jan. 22, 1970, abandoned.

[52] U.S. Cl. ........................................ 47/1.1, 47/17
[51] Int. Cl. ................................................. A01g 1/04
[58] Field of Search ........................ 47/1.1, 17–18, 47/102

[56] References Cited

UNITED STATES PATENTS 1,121,722  12/1941  Fessenden ........................... 47/17
1,808,383   6/1931  Steves ................................. 47/1.1
2,994,160   8/1961  Sinden et al. ....................... 47/1.1
3,118,249   1/1964  Bard et al. ........................... 47/1.1
3,292,305  12/1966  Stengel ............................... 47/1.1
3,461,605   8/1969  Stanhope ............................. 47/17
3,664,061   5/1972  Oepen ................................ 47/1.2

Primary Examiner—Robert E. Bagwill
Attorney—Arthur H. Seidel et al.

[57] ABSTRACT

This invention relates to apparatus for cultivating plants such as mushrooms. The plants are positioned in receptacles stacked on one another and located in air-conditioned chambers. Each receptacle is individually subjected to preconditioned air having a short distance of travel defined by channels between adjacent receptacles. An elevating means and a horizontally movable processing line are arranged for processing receptacles from a plurality of said chambers which are disposed parallel to one another.

18 Claims, 17 Drawing Figures

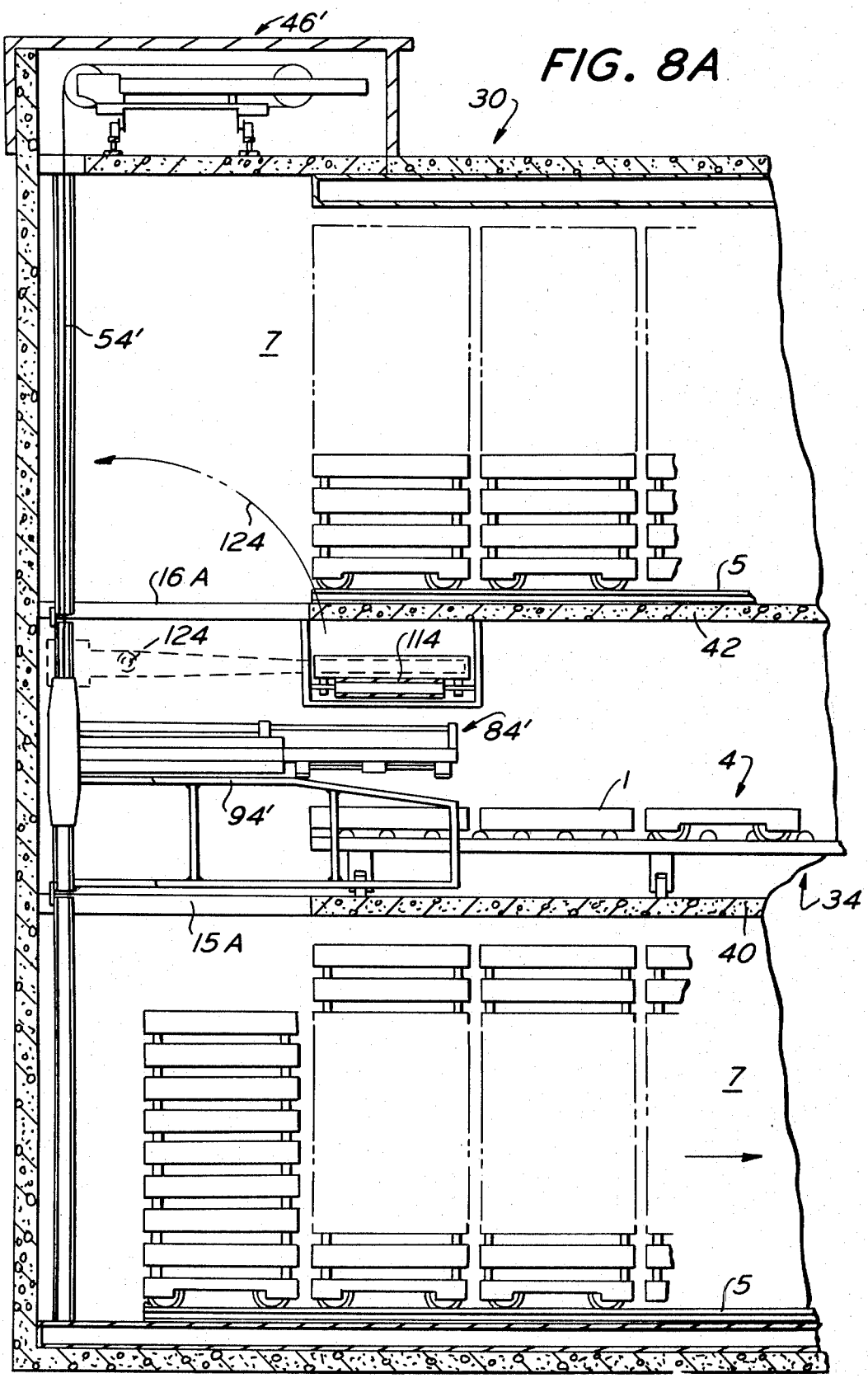

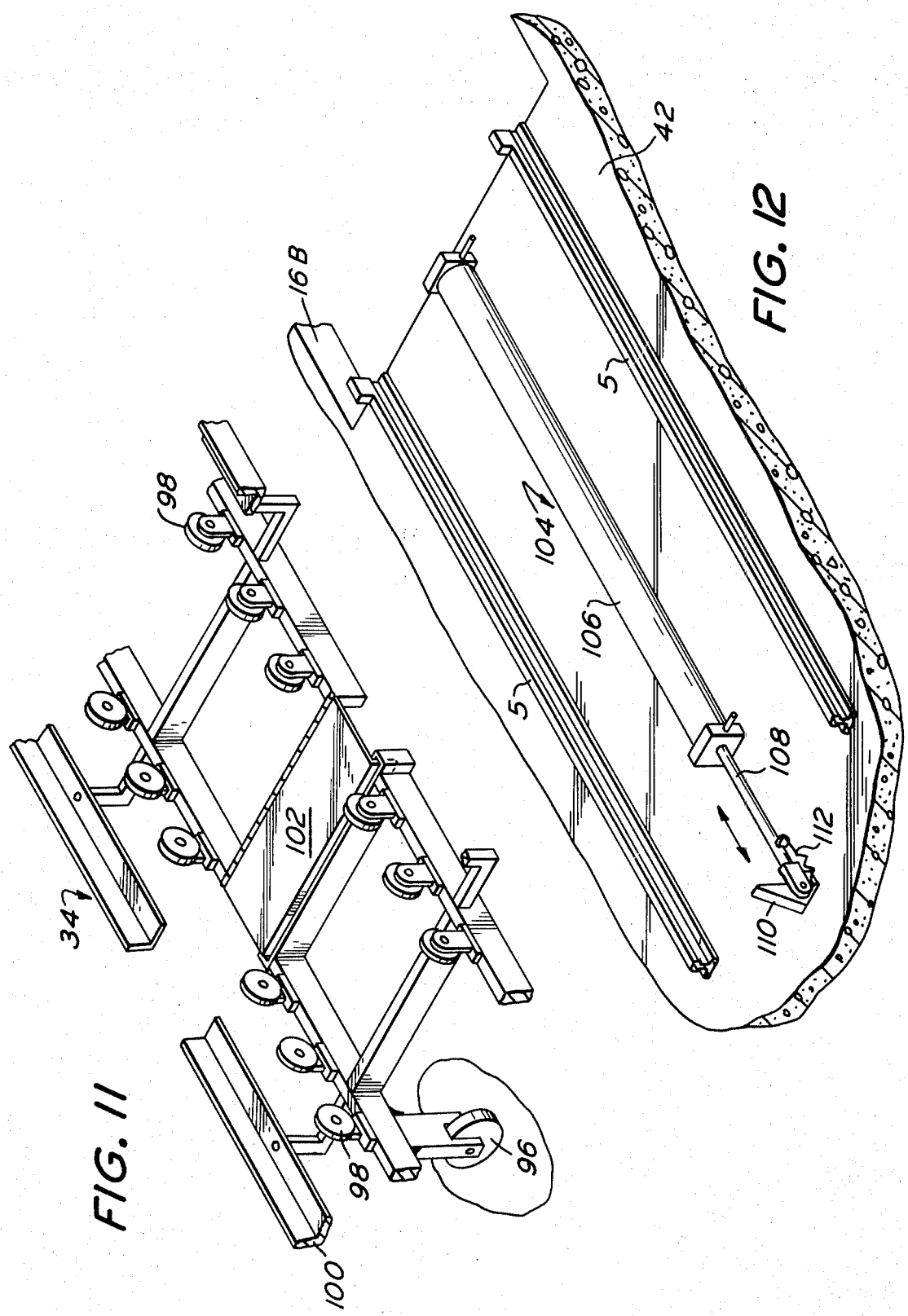

APPARATUS FOR CULTIVATING PLANTS

This application is a continuation-in-part of our copending application Ser. No. 4918, filed on Jan. 22, 1970 for Apparatus for Cultivating Plants, which application is now abandoned.

BACKGROUND OF THE INVENTION

The cultivation of mushrooms of the edible agarious campostris type known as Champignon de Paris has been known for centuries. In the beginning, such mushrooms were grown in the open air in mound beds. Later it was discovered that light was not needed for the cultivation of the mushrooms and therefore they were grown underground in galleries, quarries, etc. while retaining the use of mound beds. As the utilization of these spaces was extensive, the simple renewal of air by means of ventilation flues was sufficient. Because of the low temperatures, the mushrooms grew very slowly.

Suitable galleries, caves, and cellars and the like were not available everywhere. At the beginning of this century, an effort was made to construct buildings for the express purpose of growing mushrooms. The buildings, generally disposed underground, were not air-conditioned. Due to the wide spacing of the trays in which the mushrooms were grown, it was adequate to provide ventilation openings with or without fan means. For example, see U.S. Pat. No. 805,801.

It was necessary to maintain the frames or shelves a substantial distance apart at the top and the sides to allow the gases produced by compost and mushrooms to flow off for exhaust and to supply the necessary oxygen. Air-conditioning is necessary to provide the proper environment for the growing of mushrooms. For example, carbon dioxide tends to collect on the bottom surface of the mushrooms. A sufficiently large amount of carbon dioxide can inhibit the growth of the mushrooms.

In order to facilitate the harvesting which must take place in the cultivation area, wide passages are provided between stacks of boxes as well as large distances above and below individual shelves. Each of these features adversely affects a consistent supply of air and results in irregular air velocities. According to the location of the boxes or trays, some will receive an insufficient amount of air while others will receive too much air. Each of these is unfavorable on quality and yield of the product.

Heretofore, the growing of mushrooms took place in an environment which made it difficult to supervise workers while at the same time was unfavorable from the point of view of health. Thus, the premises for growing the mushrooms were an environment which was moist, warm, and badly illuminated. Further, it was difficult to intensively cultivate the separate boxes or trays when are stacked in a manner which prohibits free access to the boxes from above. Thus, it was difficult to cultivate, gather, water, and otherwise tend the growth of the mushrooms in the boxes.

As technology progressed, apparatus for cultivating mushrooms included the use of trays or boxes supported on shelves with the provision of a forced circulation means for air-conditioning the environment. For example, see U.S. Pat. No. 1,773,648. That patent is typical of an attempt to air-condition the growing room, but was totally inadequate due to a lack of uniformity of exposure of the trays to the air currents. Subsequent developments included utilizing endless conveyors for racks of receptacles in the growing room as disclosed in U.S. Pat. No. 3,292,305.

SUMMARY OF INVENTION

The object of this invention is to obviate the previously described drawbacks and to provide a system which satisfactorily permits the cultivation and harvesting of many mushrooms per year with the expenditure of minimum effort.

In accordance with the present invention, trays are stacked in elongated chambers having oppositely disposed walls spaced from one another. The distance between the walls, when having a stack of trays therebetween, precludes the entry of a person therebetween. Inlet and outlet openings are provided adjacent the ends of the chamber. The trays are positioned between the walls and removed therefrom by a gripper means forming a part of an elevator means.

Thus, in accordance with the present invention, a completely new manner of individually air-conditioning each tray is rendered possible. The premises in which cultivation takes place are designed so as to include air channels. The trays do not form an obstruction, but on the contrary, define guide faces for the constant guiding of the air currents. In accordance with the present invention, at least two to three times as many trays can be accommodated in a specific space as compared with prior systems so as to have a great economical advantage.

With respect to the introduction and removal of air, in one embodiment inlet openings are preferably disposed adjacent one of the oppositely disposed walls and the outlet opening adjacent the other wall. In this manner, direct air flow over each of the beds is controlled so that every tray receives a portion of the air-conditioned air suitably adjusted for the actual stage of growth. Eddy currents, secondary or tertiary currents are always present over the trays and thereby waste gases of cultivation are removed. The spacing between trays is uniform and acts as guide spaces or baffle faces. In this regard, a stack of trays including a track substantially fills the space of each chamber from floor to ceiling whereby the space between the ceiling and the uppermost tray is substantially the same as the space below the lowermost tray.

The lowermost tray of a stack is supported by a truck having the same outer dimensions as the trays. The uniform division of the space to be air-conditioned permits a uniform distribution of air. It is preferred that the floor or ceiling be provided with two horizontally disposed chambers which form the inlet and outlet conduits of the air-conditioning system. The inlet and outlet conduits of the air-conditioning system can thereby be arranged in a simple manner which is particularly advantageous in the construction and maintenance of the system.

According to the present invention, the trays are preferably stakced on trucks which are movable on rails disposed in the chambers. The chambers may be of any desired length, but preferably are disposed in parallel and are of the same length but sufficiently long so as to accommodate a plurality of stacks of trays arranged in a row. In this manner, a large number of trays is accommodated in a relative small space.

A further advantage of the invention is that gripping and elevating means are movable in a vertical direction and disposed for cycling the trays out of their chamber, through a work area, and then back into their original chamber. In this manner, individual trays or even whole stacks of trays can be cycled through the working area and then back to the original chamber. In the working area, the trays may be subjected to planting, watering, harvesting, etc. The individual attention devoted to the trays can therefore be carried out with minimum labor since the trays are brought to the workers rather than the workers going to the trays.

In an operative embodiment of the present invention, chambers for storing the stacks of trays may be disposed above and/or below the location of the working area. In the working area, there is preferably provided a conveying apparatus such as a conveyor which cooperates with the gripping devices and elevating means. In this manner, the entire system may be carried out in a manner which is substantially automatic so that only a small labor force is necessary.

For the purpose of illustrating the invention, there are shown in the drawings forms which are presently preferred; it being understood, however, that this invention is not limited to the precise arrangements and instrumentalities shown.

FIGS. 8A and 8B are left and righthand sectional views taken along the line 8—8 in FIG. 7.

FIG. 11 is a partial perspective view of the conveyor used for servicing trays.

FIG. 12 is a perspective view of the stack advancing means in one of the storage chambers.

Figure 1:
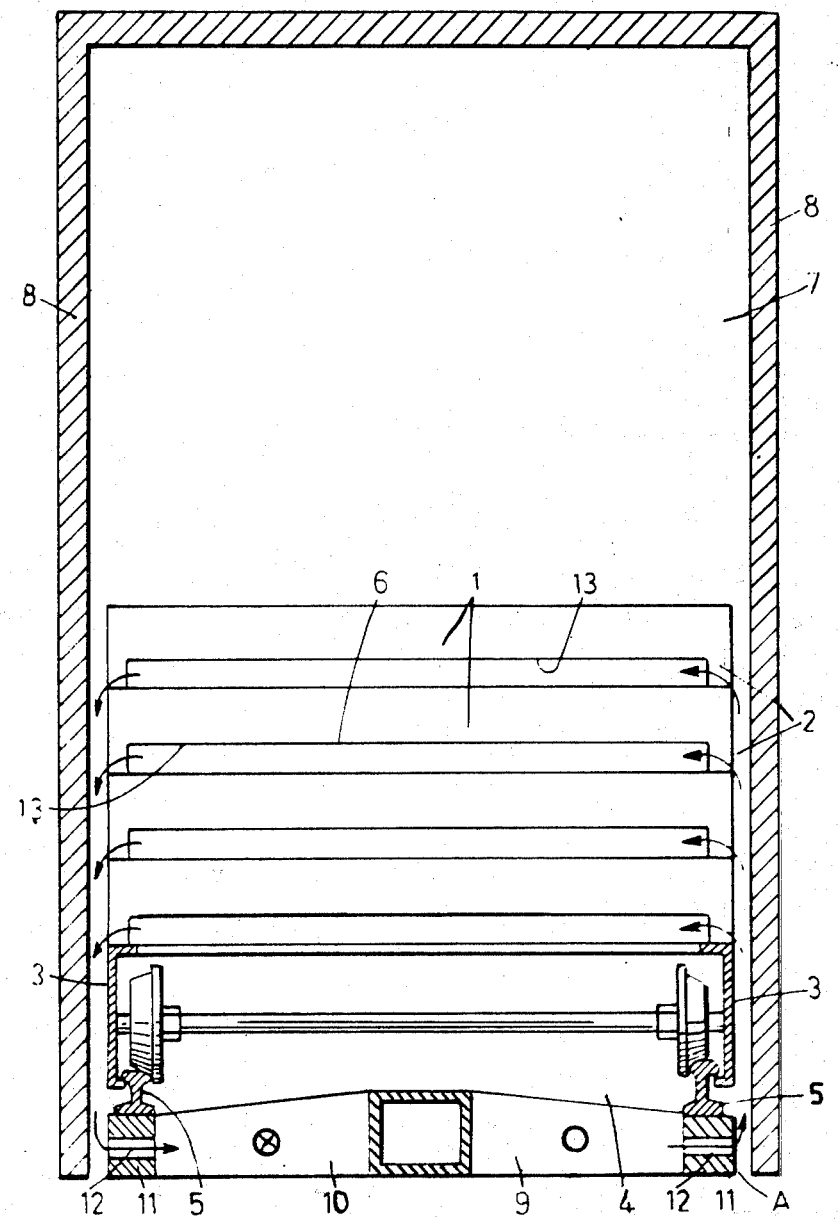
FIG. 1 is a sectional view through a channel-like chamber for receiving and storing the stacks of trays.

Referring to the drawings wherein like numerals indicate like elements, there is shown apparatus in accordance with the present invention. Referring to FIG. 1, the receptacles or trays 1 for receiving plants are stacked one over the other. Each tray is provided with a supporting foot at a corner area in a manner so that each tray may support feet on a tray thereabove. The space between trays is uniform and relatively small.

The trays are stacked on cross beams 3 of a truck 4. The truck 4 is driven on rails 5 and supports a stack designated generally as 6 within a channel-like chamber 7. The chamber 7 is defined by lateral walls 8. The walls 8 are disposed at a distance from one another corresponding approximately to, but slightly greater than, the width of the trays 1 and the truck 4. As shown in FIG. 1, the width of the trays corresponds generally to the width of the truck 4.

On the floor of the chamber 7, there is provided a double conduit air supply system for the chamber 7. The system includes an air supply conduit 9 and an air exhaust conduit 10 which are parallel to the walls 8 and disposed beneath the stack.

At the sides of the conduits 9 and 10, there are provided sections 11 which support tracks 5. The sections 11 are provided with bores 12. The bores 12 provide communication for flow of air from the conduit 9 into the narrow vertical space between the stack 6 and one of the walls 8. The bores 12 in the section 11 on the opposite side of the chamber 7 provide communication between the exhaust conduit 10 and the narrow vertical space between wall 8 and the stack 6. The bores 12 may be provided with valves or other adjustable closures.

Air introduced under pressure from conduit 9 passes upwardly along one side wall 8, into the space between adjacent trays of the stack 6 as shown by the arrows in FIG. 1, and then downwardly through the space adjacent the opposite wall to the exhaust conduit 10. The bottom surface of one tray cooperates with the upper surface of the tray therebelow to define an air flow passage to facilitate removal of gases and moisture. In this manner, satisfactory ventilation of the chamber 7 is insured so that satisfactory growth conditions and uniform growth of plants may be insured.

Figure 2:
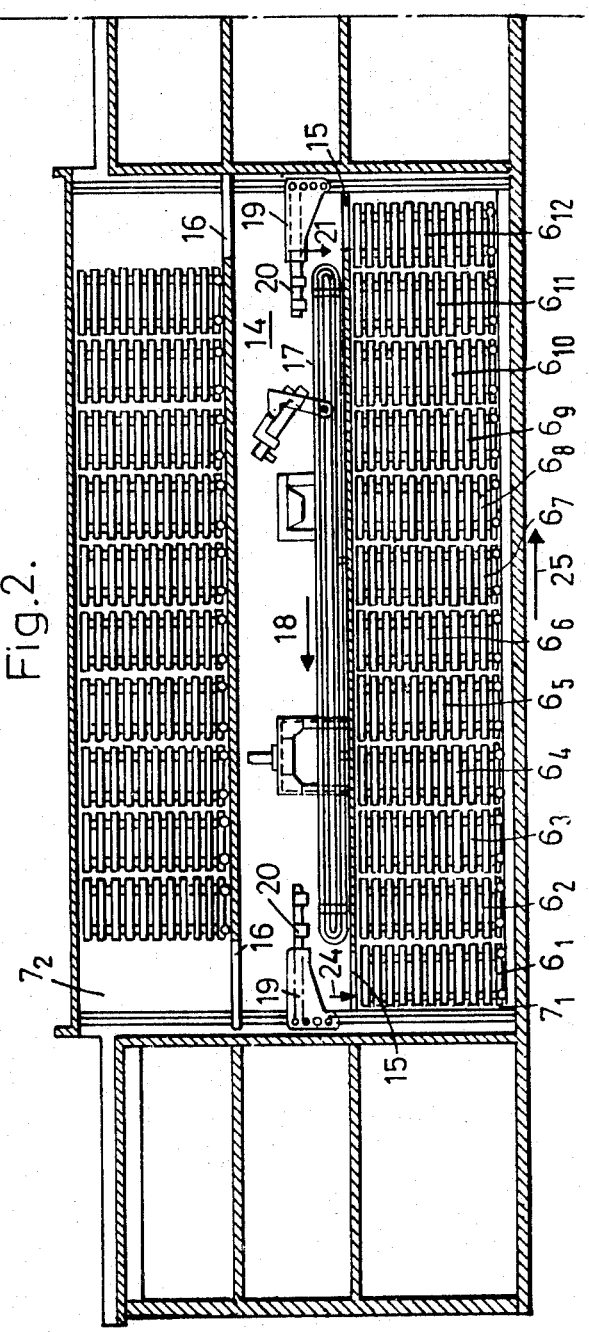
FIG. 2 is a vertical sectional view through a building provided with channel-like chambers as shown in FIG. 1.
Figure 3:
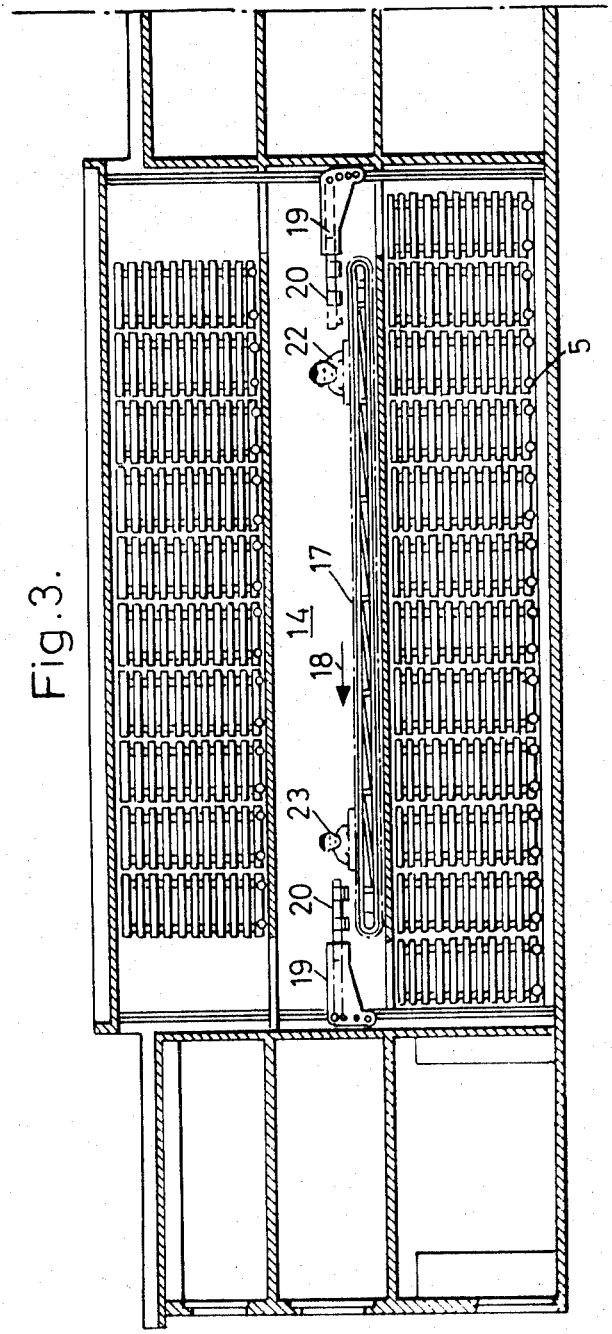
FIG. 3 is a vertical sectional view through a building provided with channel-like chambers as shown in FIG. 1.
Figure 4:
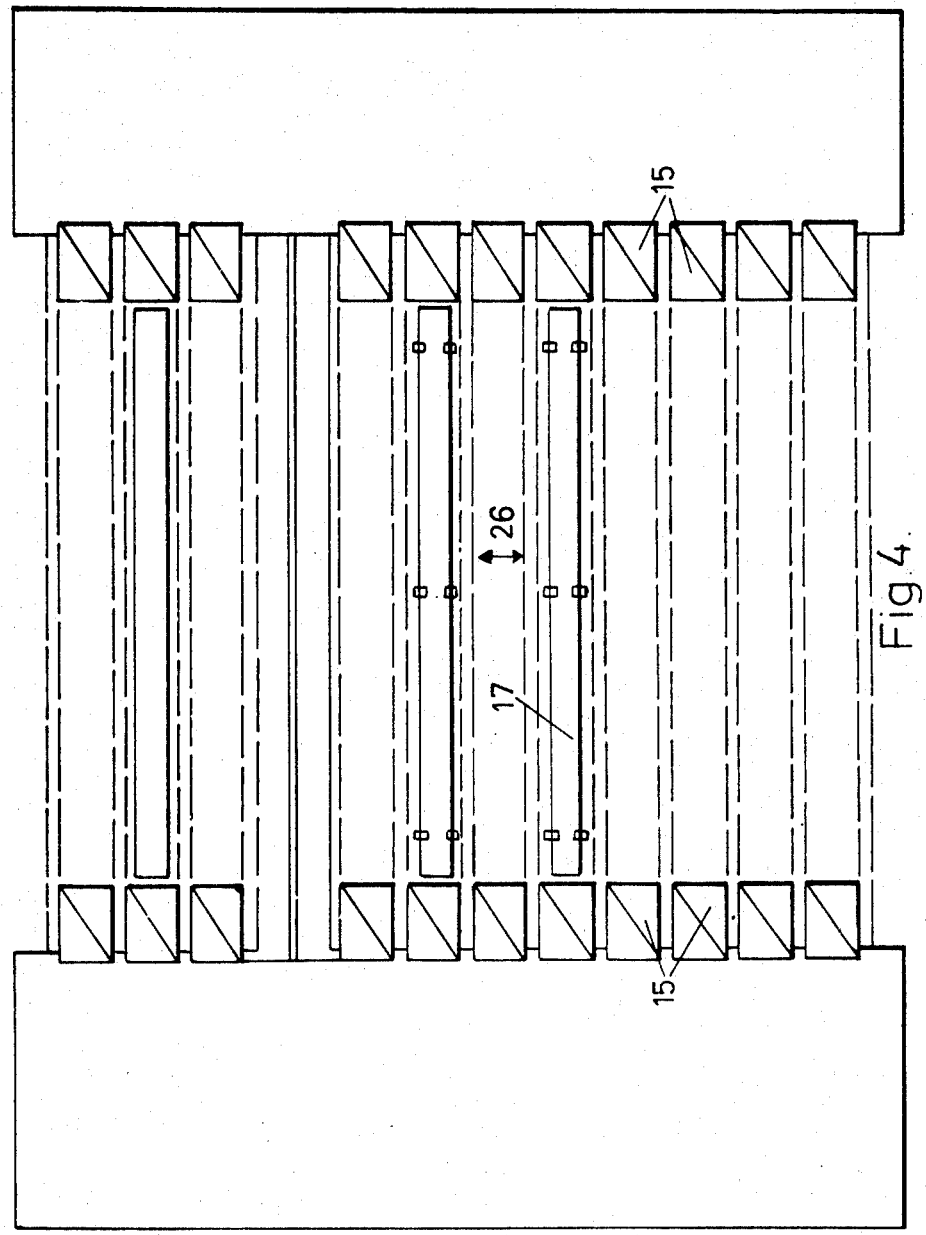
FIG. 4 is a plan view of the working area through which the trays are processed.

In FIGS. 2-4, there is shown a building in which is provided a plurality of parallel chambers 7 for the cultivation of plants on a mass production type basis. In this embodiment, a plurality of channel-like chambers 7 are disposed next to one another on a first floor level below a chamber 14 which is a working area level. In addition, a plurality of channel-like chambers 7 are provided parallel to one another at an elevation which is above the level of the working area 14. At the ends of the chambers 7, in the floor or the ceiling with respect to the elevation of the working area 14, openings 15 and 16 are provided to facilitate cycling of the trays through the working area 14.

FIG. 2 shows cycling of the trays through the working area 14 for purposes of composting. FIG. 3 shows cycling of the trays through the work area 14 for purposes of harvesting. To facilitate movement of the trays through the working area 14, a conveyor 17 is provided. The direction of movement of the trays is indicated by the arrow 18. In the area of the openings 15 and 16, there is provided a vertically movable elevator means having a gripping means designated as 19 and provided with horizontally movable gripper arms 20. The gripper means 19 and the arms 20 are actuated in any convenient manner such as by hydraulics, pneumatics, or mechanically.

As may be seen in FIG. 2, each of the retractable gripper arms 20 has a pair of gripping elements for gripping one of the receptacles. When the arms 20 are retracted, the gripper means 19 are freely movable vertically through the openings 15 and 16 either to the stacks above the openings 16 or to the stacks below the openings 15. Any suitable automatic means may be provided to effect extension of the arms 20 to grip a receptacle, retract the latter, and then through the elevator means lower or raise the tray or stack to the level of the working area 14. Thus, each gripping means 19 forms a means for automatically removing a receptacle, tray or stack for delivering the same to the working area 14 or for returning the same to its channel-like chamber 7.

The gripper means 19 may be moved downwardly in the direction of arrow 21 to seize a tray in the stack $6_{12}$ from the chamber containing the stacks $6_1$ to $6_{12}$. The stack or tray is then lifted upwardly to the conveyor belt 17 for movement in a horizontal direction as indicated by the arrow 18. The worker 22 can now perform various jobs with respect to the plants in the tray such as gathering or harvesting mushrooms in a manner whereby the tray is attainable from all sides free from obstructions. A different worker 23 can operate the gripper means and elevator means at the lefthand end of the belt 17 so that the tray may be returned to its channel-like chamber 7.

The tray may actuate a switch which stops the conveyor 17 whereupon the gripper means 19 seizes the tray and places it onto the stack $6_1$ as indicated by the arrow 24. The whole procedure may be controlled so as to be fully automatic.

The stacks $6_1$ to $6_{12}$ advance in the direction of arrow 25. See FIG. 2. This may be attained automatically since the rail 5 may have a certain inclination so that the stacks roll from left to right in FIG. 2 under the action of gravity. If desired, positive pushing means may be provided to effect such cycling. A circuit or cycling may then take place until the mushrooms are ready for gathering. Until the mushrooms are ready for gathering, the stacks $6_1$ to $6_{12}$ remain in the air-conditioned channel-like chamber 7.

When the mushrooms are ready for gathering, the trays are cycled through the work area 14. This may be accomplished in a comparatively short period of time. As pointed out above, the gripper means 19 descends in the direction of arrow 21, lifts the trays onto the conveyor 17. Gathering or harvesting is done while the trays move along the conveyor 17.

The apparatus described above for emptying the channel-like chambers may be utilized to supply new trays with the entire cycle for growth of mushrooms repeated. It is of course possible during the curing time for checking purposes, watering purposes or the like, to cycle the trays onto the conveyor 17. The apparatus of the present invention facilitates proper air-conditioning and growth of mushrooms in a minimum amount of time with the minimum amount of workers under satisfactory working conditions. Along the conveyor 17, there may be provided presses, spiking, and covering machines as well as harvesting machines to thereby increase automation of the system.

FIG. 4 illustrates a plan view of the elevation containing the work area 14. As shown therein, the openings 15 leading to the parallel channel-like chamber 17 are illustrated. The conveyor 17 is movable cross-wise in the direction of arrow 26 so as to be associated with a selected one of the channel-like chambers 7 containing stacks of trays to be cycled. The gripper means 19 can likewise be moved along the building so that in a sequential manner all of the trays may be removed from an opening 15 associated with the particular channel-like chamber 7 which is being cycled.

The apparatus described above and illustrated in FIGS. 1–4 is particularly suitable for the cultivation of Champignons. The apparatus is also suitable for the growth of other mushrooms or other horticultural plants. Small alterations in the apparatus can be carried out by those skilled in the art without departing from the scope of the invention.

The apparatus can provide for the preparation of manure to be used in the trays. A more uniform compost may be obtained which is then introduce with the base for the corresponding plants. The harvest yields as well as the quality of the products are substantially increased by the use of the invention.

A more detailed explanation and illustration of the apparatus described above appears in FIGS. 5–15. As shown more clearly in FIG. 5, there is illustrated an external perspective view of a building designated as 30 for practicing the invention disclosed herein. Fermentation piles 32 may be provided in any convenient area alongside the building 30.

Figure 6:
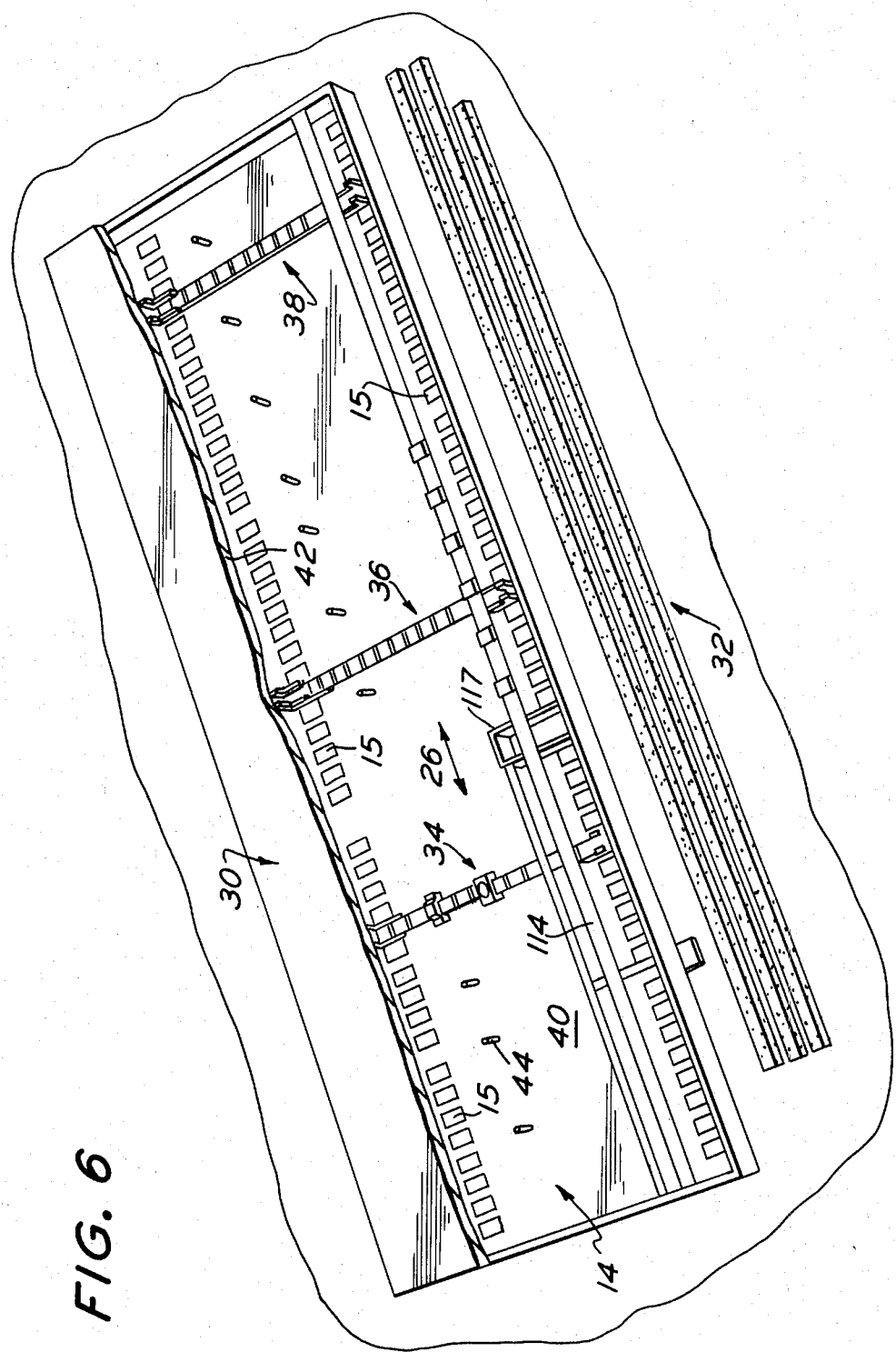
FIG. 6 is a perspective view of the working area in the building illustrated in FIG. 5, showing the structure shown in FIG. 4, but in a less diagrammatic appearance.

Referring to FIG. 6, the building 30 is illustrated at the level of the working area 14 which may be ground level. As illustrated, the length of the working area 14 may be sufficient so as to require a plurality of conveyors 34, 36, and 38, each of which corresponds to the conveyor 17 described above. Each of the conveyors will service a plurality of channel-like chambers therebelow with access being provided by way of the openings 15 in the floor 40. The ceiling for the work area 14 is identified as 42. Support columns 44 may be necessary and extend between the floor 40 and ceiling 42. In this event, the conveyors 34, 36 and 38 are constructed in a manner whereby they may be divided into sections so as to be able to continue to reciprocate back and forth in the direction of arrow 26 to facilitate cycling of stacks within the parallel channel-like chambers 7 therebelow.

Figure 7:
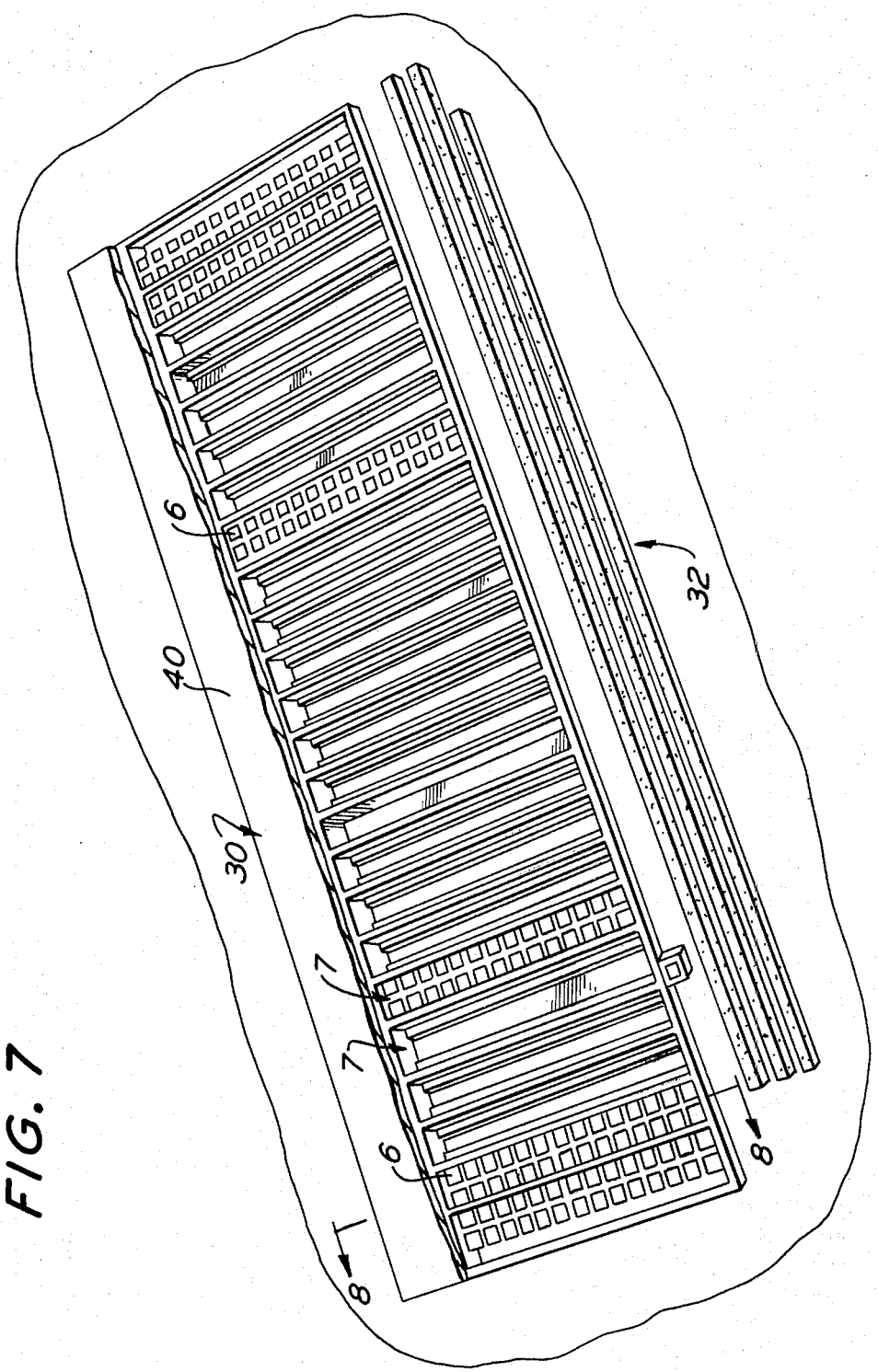
FIG. 7 is a perspective view of the below ground level portion of the building in FIG. 5, illustrating the various chambers for growing plants in accordance with the present invention, with some of the chambers loaded and some of the chambers being illustrated empty.

Referring to FIG. 7, the space below the work area 14, which may be below ground level, is divided into a plurality of parallel channel-like chambers 7. For purposes of illustration, some of the chambers 7 are empty and others are filled with stacks 6.

Figure 8B:
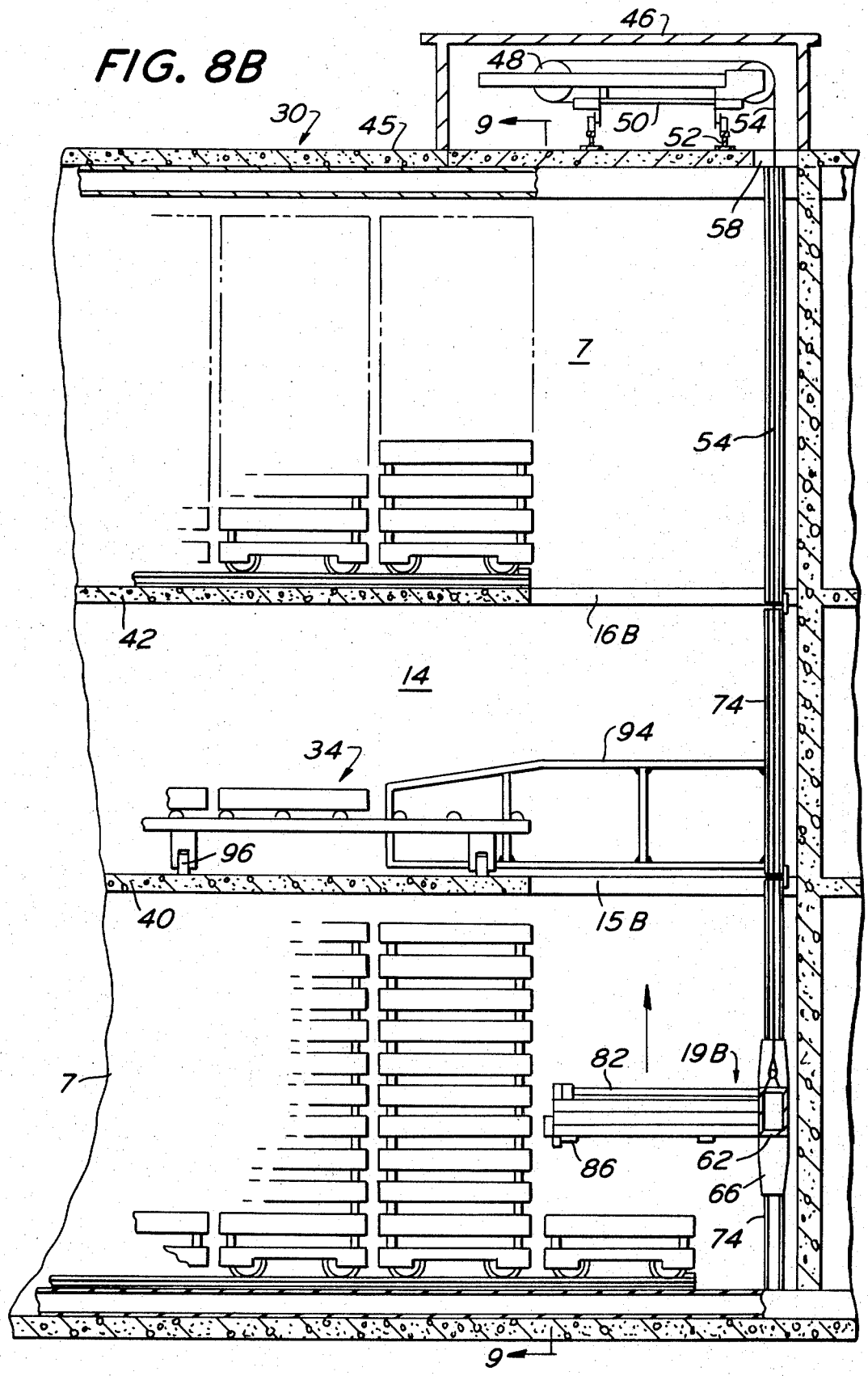

In FIGS. 8A and 8B, there is illustrated a transverse cross section of the building 30 showing the stacks supported therebelow and thereabove the working area 14. Each of the upper and lower channel-like chambers 7 are filled with stacks which are being recycled by the conveyor 34.

Referring initially to FIGS. 8A and 8B, it will be seen that the stacks of trays in the chamber 7 directly below the conveyor 34 and the chamber 7 directly above the conveyor 34 may be cycled so that each tray and the truck for each stack are serially processed along the conveyor 34. The trays are returned to their respective chambers through the openings 15A or 16A. The trays and each truck are withdrawn from their respective chambers through the openings 15B or 16B.

The gripper means and elevator means associated with the chambers and conveyor as shown in FIG. 8A is the same as that shown in 8B. Accordingly, only such means as is illustrated in FIG. 8B will be described in detail. To some extent, corresponding primed numerals will be provided on the structure shown in FIG. 8A.

Figure 5:
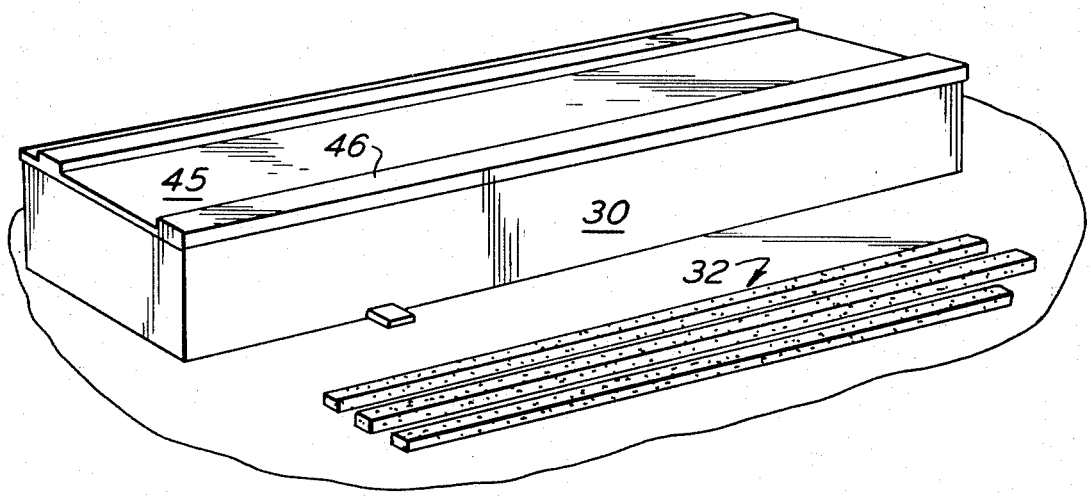
FIG. 5 is a perspective view of the outside configuration of a building for cultivating plants in accordance with the present invention.

As shown in FIGS. 5 and 8B, the roof 45 of the building 30 is provided with a longitudinally arranged roof extension 46. Within the extension 46, there is housed an elevator control means including a vehicle 50 supporting a plurality of reels 48 around which are wound a cable 54. The vehicle 50 is mounted on rails 52 so that it may move along the length of the building 30. Within a housing on the vehicle 50, there is provided a motor 56 for operating the reels 48 and causing the vehicle 50 to move along the rails 52.

Figure 13:
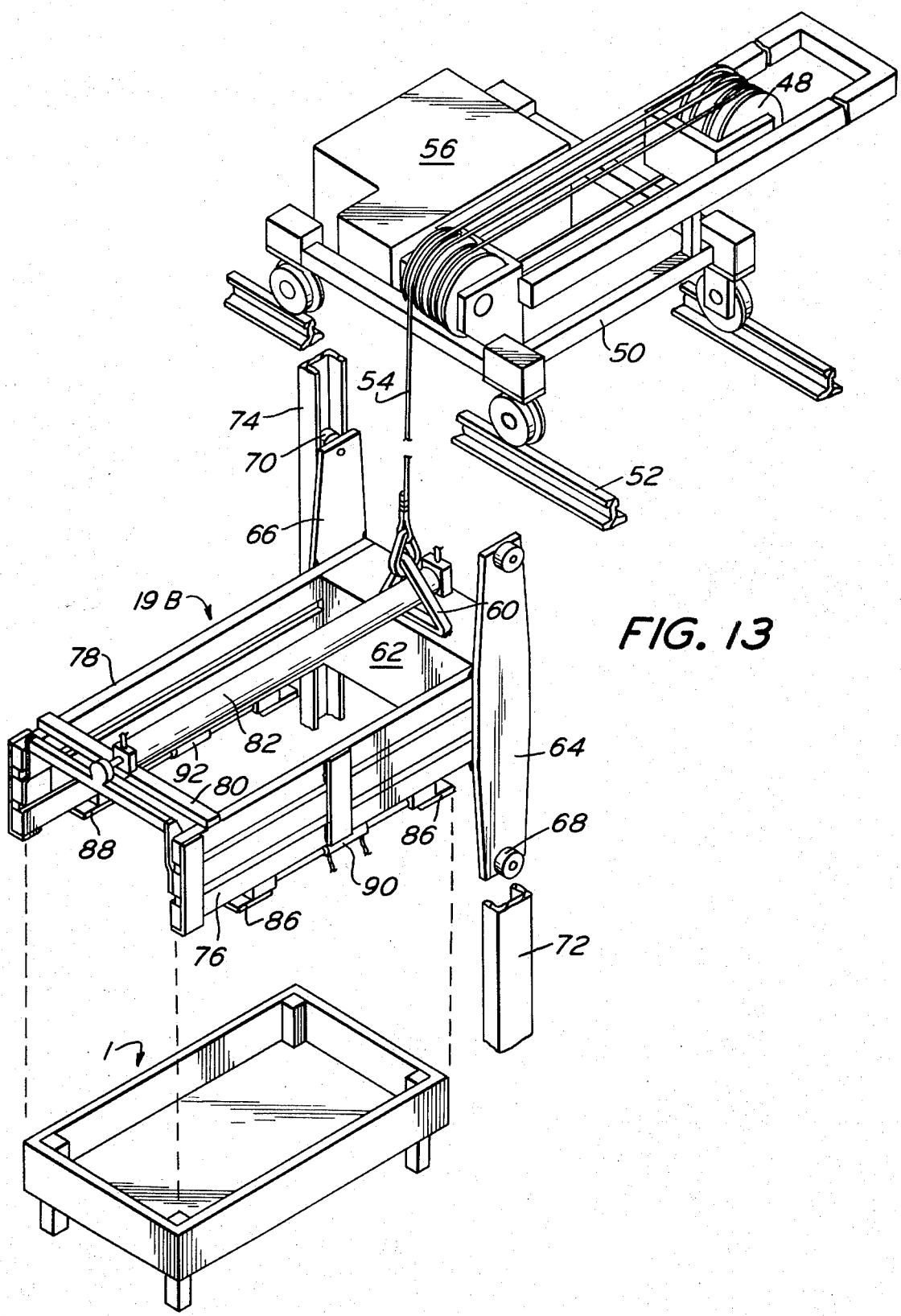
FIG. 13 is a perspective view of the elevator means with the gripping means in its retracted position.

The cable 54 is adapted to extend through a longitudinally extending slot 58. Slot 58 is disposed within the roof 54 and provides communication between the upper chambers 7 and the extension 46. Referring to FIG. 13, it will be noted that the cable 54 at its lower end terminates in a clasp which is releasably connected in any convenient manner to a hook 60 on the body of the elevator means 19B. The body of the elevator means is U-shaped having arms 76 and 78 connected to a bight 62.

The body of the elevator means 19B includes upright guide plates 64 and 66. Plate 64 is provided with guide rollers 68 at each end and adapted to extend into the channel 72. Plate 66 is provided with rollers 70 at each end and which are adapted to extend into channel 74.

Figure 14:
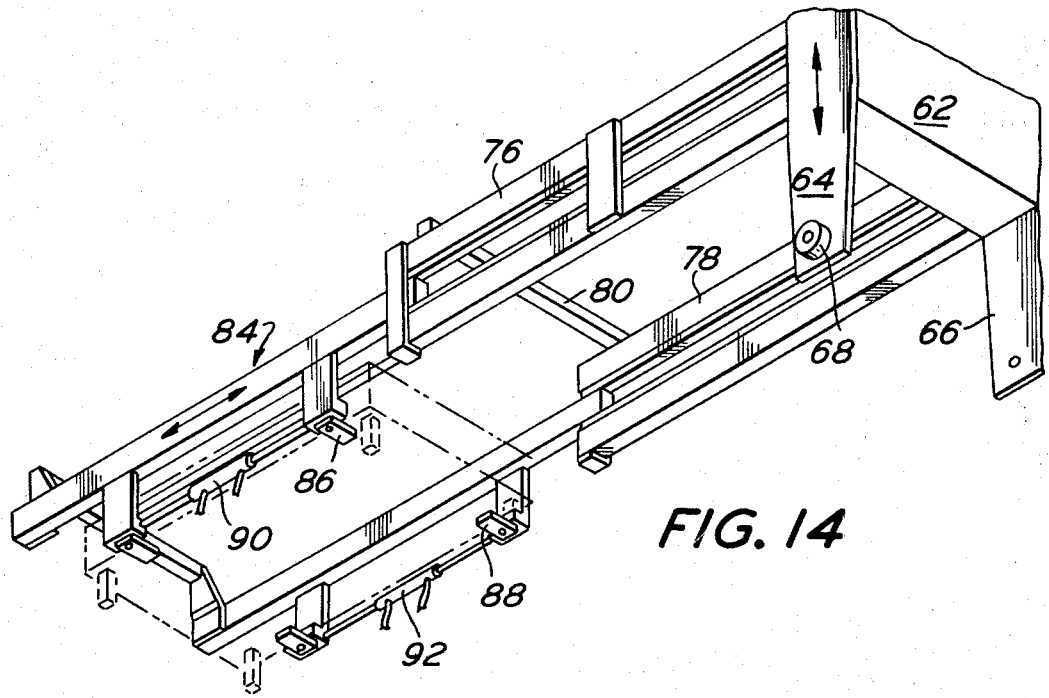
FIG. 14 is a bottom perspective view of the elevating means with the gripping means in an extended position.
Figure 10:
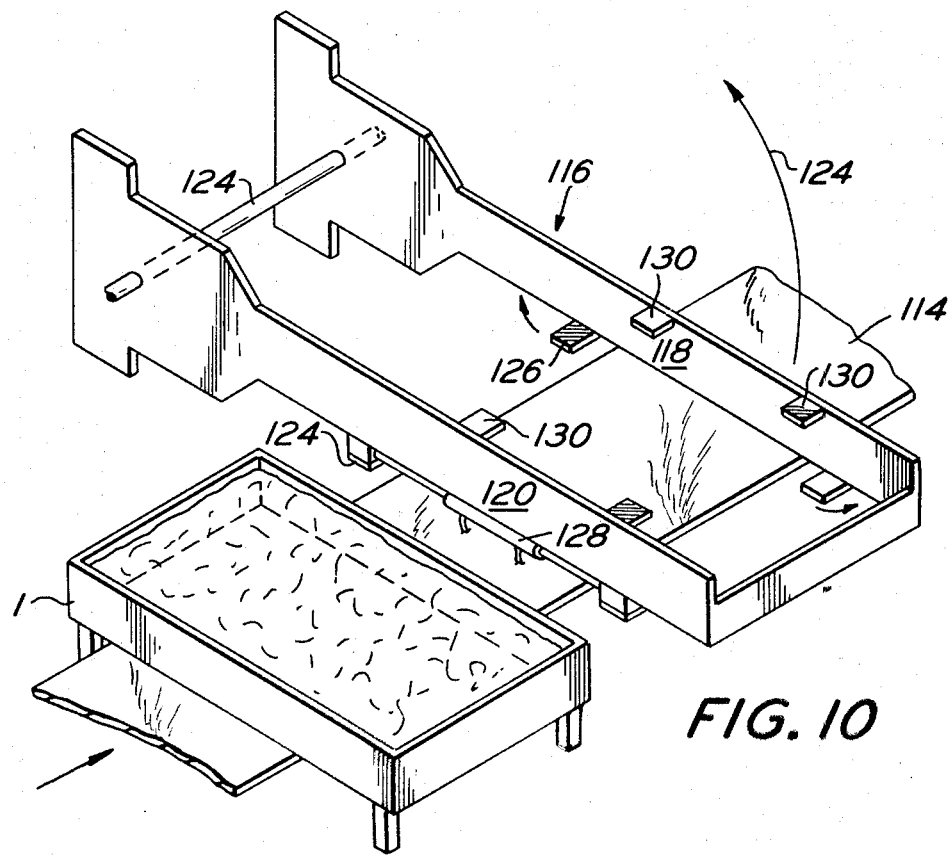
FIG. 10 is a perspective view of a portion of a conveyor and an invert dumping means for the trays.

A cross brace 80 extends between the arms 76 and 78 of the body of the elevator means 19B. A cylinder 82 is supported by the cross brace 80 and the bight 62. Cylinder 82 is adapted to extend and retract the gripper means 84. In FIG. 13, the gripper means 84 is in its retracted position. In FIG. 14, the gripper means 84 is in its extended position.

The gripper means 84 is provided with a pair of pivotably mounted fingers 86 on one side and a pair of pivotably mounted fingers 88 on the other side. Cylinders 90 and 92 are supported by the gripper means for selectively causing the fingers to pivot from an aligned position as shown in FIG. 13 to a parallel position as shown in FIG. 14.

The cylinders 90 and 92 may cause the fingers 86 and 88 to pivot regardless of whether the gripper means 84 is in its extended or retracted position. In the position of the fingers 86 and 88 as illustrated in FIG. 13, the elevator means 19B may descend downwardly and embrace the tray 1. Thereafter, actuation of the cylinders 90 and 92 will cause the fingers 86 and 88 to rotate 90° inwardly so as to extend below the tray. Thereafter, movement of the elevator 19B in a vertical direction will result in the tray being carried thereby.

Thus, the elevator means 19B may pick up a tray, elevate the same upwardly through the opening 15B to a position between the guard rails 94 which are fixedly secured to the sections of the channels 72 and 74 disposed between the floor 40 and ceiling 42. Thereafter, cylinder 82 may be actuated to deposit the elevator tray onto the conveyor 34. In like manner, elevator means 19A removes the tray and returns it to its chamber.

Each of the upper and lower chambers 7 are provided with stationary sets of channels corresponding to and adapted to be aligned with channels 72 and 74. However, there are no channels at the floor level of the working area 14 except for channels 72 and 74 at each end of each conveyor.

Each of the conveyors 34, 36 and 38 is provided with guide rails 94 at their ends. Each of the guard rails 94 is connected to and support channels 72 and 74 which are adapted to be aligned with selected ones of the sets of stationary channels in the respective upper and lower chambers 7 which are serviced by the respective conveyors. In order that conveyor 34 may move in the direction of arrow 26, it is supported on the floor 40 by means of wheels 96 which rotate about axes parallel to the length of the conveyor 34.

Referring to FIG. 11, there is partially illustrated a portion of the conveyor 34. The frame of the conveyor includes rubber wheels 98 at spaced points therealong for rotatably engaging the bottom surface of the tray. The wheels 98 are supported in two rows. Each row of wheels is spaced from an outrigger rail 100 so as to provide a space through which the legs on the tray will extend. In the area of the columns 44, the conveyor 34 is separable into two sections in any convenient manner. In FIG. 11, the sections are joined by a pivotably mounted joining plate 102. In this manner, the conveyor 34 may move in the direction of arrow 26 notwithstanding the fact that the working area 14 includes columns 44 which are necessary to support the weight of the stacks in the upper chambers 7.

If it is desired to have a positive means for moving stacks to a position adjacent the end of the rails 5 adjacent the openings 15B and 16B, a stack transport means 104 may be provided. See FIG. 12. On the floor 42 within the upper chamber 7 between rails 5, there is provided a stack transport means 104. Means 104 includes a cylinder 106 having a piston rod 108.

At the end of piston rod 108 remote from the piston within the cylinder 106, there is provided a pivotably mounted claw 110. As claw 110 moves from right to left in FIG. 12, it engages the frame of the truck 4 and pivots clockwise against the action of the spring 112. As soon as the claw 110 moves past the truck, the spring 112 retracts so as to prevent an upright face on the claw 110 engaging the truck. Thereafter, retraction of the piston rod 108 moves the entire stack to the end of the rails 5 against the limit stop so as to be in position for contact by the gripper means 84. The means 104 may be provided in addition to the gravity feed attained by the difference in elevation at the ends of the rails 5.

Figure 15:
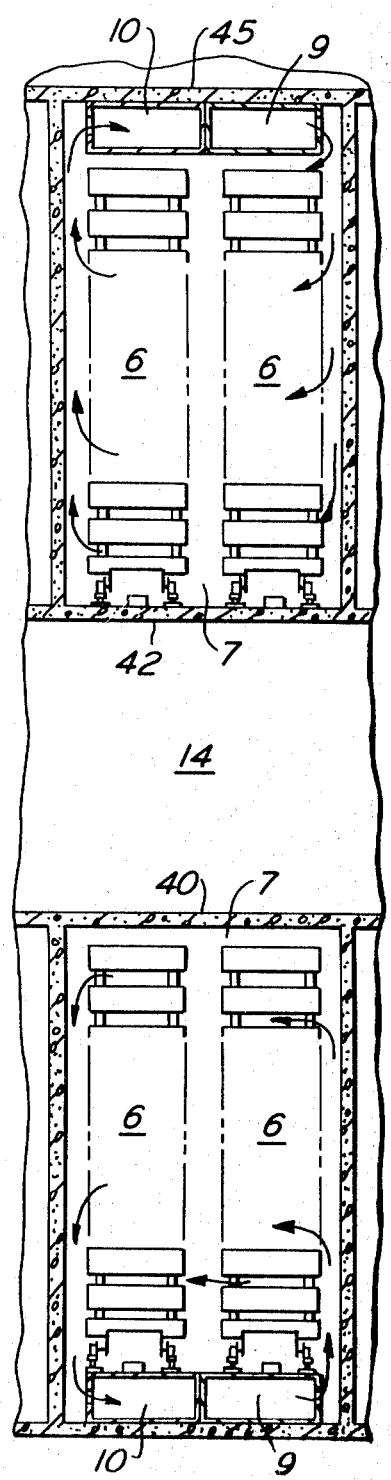
FIG. 15 is a sectional view similar to FIG. 9 but illustrating a different embodiment for the air circulation means.

Referring to FIG. 15, the inlet conduit 9 and the outlet conduit 10 in the lower chamber 7 may be alongside one another and supporting the rails 5. The chamber 7 above the working area 14 may have its inlet and outlet conduits 9 and 10, respectively, supported by the ceiling which is the lower surface of the roof 45 on the building 30. In this manner, preconditioned air may be circulated as described above and indicated by the arrows.

Figure 9:
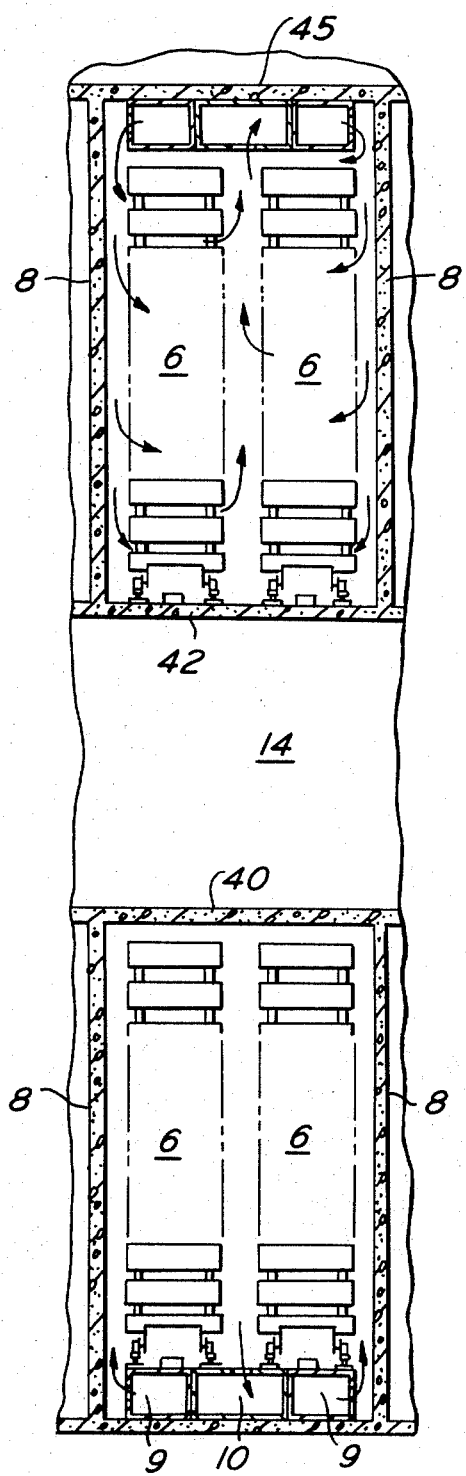
FIG. 9 is a sectional view taken along the line 9—9 in FIG. 8B.

The arrangement of the inlet and outlet conduits for the circulation of preconditioned air for each of the chambers 7 may be as shown in FIG. 9. In FIG. 9, each of the chambers 7 has a pair of inlet conduits 9 on opposite sides of the chamber with a return or exhaust conduit 10 disposed therebetween. Otherwise, the air duct arrangement as shown in FIG. 9 is the same as that described above with air circulation as indicated by the arrows.

Figure 16:
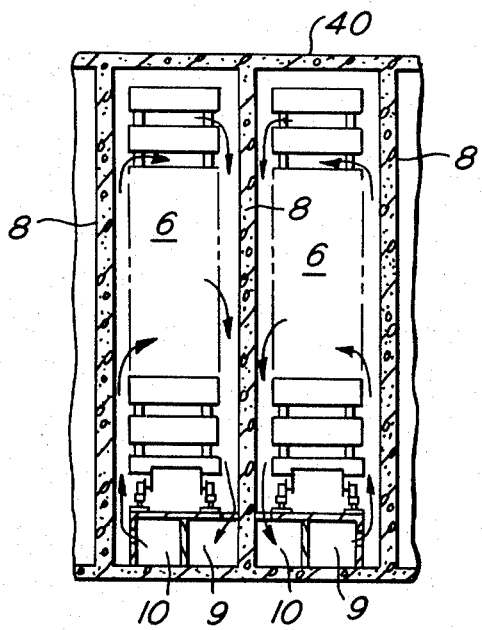
FIG. 16 is a view similar to FIG. 9 but shows another embodiment wherein only one stack of trays is provided in each chamber.

If desired, the width of the chamber 7 may be sufficiently narrow so as to accommodate only a single stack of trays as shown in FIG. 16. In this alternative, the relationship described above would be maintained so that uniform air flow may be attained in the same manner as described above. In FIG. 7, the distance between adjacent trays as well as the distance from a side face of the tray and the adjacent wall 8 is substantially identical. In FIG. 9, for example, the distance between stacks disposed side-by-side is twice the distance between the adjacent trays on a stack or the distance from a stack to the adjacent wall 8.

A conveyor 114 is supported within the elevation of the working area 14 by the ceiling 42. See FIGS. 6, 8A and 10. An invert mechanism designated generally as 116 is disposed within the enclosure 117. There are no chambers 7 in the vertical plane defined by the enclosure 117. Trays which have been harvested are in any suitable manner elevated and positioned onto the conveyor 114.

When a tray reaches the position of the invert mechanism, it is grasped by the mechanism and rotated 180° so as to dump the contents into a suitable bin or onto a means for conveying the same to any desired storage area. The mechanism 116 includes a pair of arms 118 and 120 interconnected together and mounted for rotation through an arc of about 180° by means of shaft 124. The distance between arms 118 and 120 is greater than the width of the tray.

A motor, not shown, is geared to shaft 124 to elevate the mechanism 116 to an inclined position so that conveyor 114 may move a tray to a position therebelow. The mechanism 116 is then lowered so as to embrace the tray. Thereafter, fingers 124 and 126 are pivoted from an aligned position parallel to one another to a position wherein they extend beneath the tray. A cylinder 128 is supported by the arm 120 to manipulate the fingers 124 through an arc of 90°. A similar cylinder is supported by arm 118. The fingers and their actuating cylinders on the mechanism 116 are identical to those on the gripper means 84.

The invert mechanism 116 and the conveyor 114 constitute a mechanical means for disposing of the trays and their contents after the mushrooms have been harvested. In this manner, minimum labor is required. Due to the size of the trays, a loaded tray has a weight of approximately 800 pounds. In the absence of some mechanical means for manipulating the trays, excessive labor would be required to dispose of the trays.

As described above, trays are loaded and arranged in stacks in the narrow channel-like chamber 7. It is not deemed necessary to describe and illustrate electrical circuitry for operating various switches and motors associated with the apparatus, since the same is considered to be within the skill of those versed in the art. During pasteurization of the mushrooms, the air circulation means has a capacity to change the air in each chamber 50 times per hour. During the growing portion of the cycle, the air in each chamber is only changed 22 times per hour. During the growing cycle, air at a slow velocity of about 2 to 3 inches per second has been found to be satisfactory to avoid scale and discoloration while developing a hardier mushroom. In the pasteurization cycle, the air will have a velocity of about 8 inches per second. We combine slow flow with slow velocity across the trays while providing a large amount of air. The air travels through a short distance from the inlet conduit to the outlet conduit so that it may accumulate a large amount of spores and its temperature as well as its humidity may be more accurately controlled. There is a regularity of the air velocity due to the smallness of the chambers as compared with the large room which would have differential air flow rates at different parts of the room.

The present invention permits a large number of mushrooms to be grown in a small amount of space with the optimum environmental conditions for growing a hearty crop in a minimum amount of time with a minimum of labor. At the same time, the present invention achieves a maximum of commercial efficiency through higher yields and better quality at a reduced cost. As pertains to the labor force, their working conditions in the working area 14 are infinitely better than those associated with the systems utilized heretofore as pertains to humidity, lighting, comfort, etc.

A typical cycle utilizing the present invention would be as follows:

| | | air: | compost: | relative humidity air: |
|---|---|---|---|---|
| 1. 1 day | pasteurization of the compost | 58–60°C | 58–60°C | 100% |
| 2. 5 days | conditioning of the compost | 30–40°C | 48–52°C | 95% |
| 3. 11 " | incubation. Compost has been mixed with mycelium (Spawn). Spawn runs through compost. | 16–24°C | 24–26°C | 95% |
| 4. 10 " | holding. Compost has been cased (covered with a layer of soil 1½ inches). Mycelium grows through casing soil. | 16–24°C | 24–26°C | 90% |
| 5. 3 " | formation of small mushrooms. fructification | 15–17°C | 20–24°C | 85% |
| 6. 36 " | yield in five flushes of 2–3 days each | 15–17°C | 18–22°C | 85% |
| 7. | cook out and emptying | 70°C | 65–70°C | 100% |

During stages 2 through 4, the temperature of the compost is more important than the temperature of the air. The temperature of the air is principally a means of holding the compost inside certain temperature limits. In stages 1 and 7, the object is to destroy all animal pests and plant diseases. This is accomplished by the temperature of the air and compost. In stages 5 and 6, the temperature and humidity of the air are more important than those of the compost.

The initiation of growth of mushrooms as per stage 5 should be initiated through a drop in temperature and a marked increase in fresh air. For satisfactory results, this should be done at the exact moment when the mycelium comes to the surface of the casing soil. If they are not given air, mycelium will grow heavily on the surface of the beds, build a mat, and prevent the formation of hardy bodies. As to the amount of fresh air that mushrooms need, we have calculated that for 6,850 square feet of bed area, approximately 2,700 cubic feet per minute of air would be necessary.

For disease control, it is important that all air is filtered and that some means be provided so that the air from one chamber 7 is not mixed with the air of another chamber. It is desirable to have the air-conditioning units for the chambers below working area 14 to be separate and apart from the air-conditioning units for the chambers above the working area 14. This greatly reduces the amount of conduits and loss of heat in addition to simplifying maintenance. It is important that the incoming air from conduit 9 be directed straight upwardly parallel to the walls in the space between the walls and the trays with just the opposite for the return air. A suction fan may be connected to each of the exhaust conduits to provide a control on the return air flow. Thus, a balanced air flow may be obtained by forcing air into the chambers using a fan having a pressure and speed which is equal to the pressure and speed of the exhaust fan. During certain growing stages when less air flow is needed, this may be achieved by a time clock which stops the fans at adjustable intervals.

The length of the legs on the trays is preferably chosen so that the distance between trays is approximately 5 inches. If the distance between trays is substantially less than 5 inches, mushrooms which grow to a height of 2 to 2½ inches would form a barrier and interfere with the uniform air flow. If the distance is greater than 6 inches, it is believed that the air flow would not accomplish its intended purpose of removing gases underneath the mushroom heads. These figures are predicated on the size trays described hereinafter.

Heretofore, it has been proposed to transport trays or stacks of trays by means of fork lift trucks. The use of fork lift trucks materially contributes to transmission of diseases and detracts from proper disease control. For example, fork lift trucks can ride over casing soil on the floor and carry it all over the building, thereby infecting other portions of the building. The use of fork lift trucks requires wide doors which permits flies, spores, and other insects to have free access throughout the entire premises. Further, fork lift trucks require substantially wider channel-chamber for storing the trays and racks of trays.

In cycling the stacks of trays from a particular chamber 7, through the working area 14, and back to the same chamber, the present invention enables this to be accomplished with a tray being outside of its chamber 7 for a period of only 5 to 6 minutes. When the conveyor 34 is to be moved from a position above or below a particular chamber 7 to an adjacent chamber, the cable 54 is disconnected from the hook 60, wound around the reels 48, and then vehicle 50 moved to a position over the next chamber 7. The channel sections 72 and 74 move with the conveyor 34 and the guard rails 94 so as to be over or below the next chamber 7 to be cycled. Thereafter, the cable 54 is lowered and reconnected to the hook 60.

It is to be noted that the present invention has an absence of wide alleys or gangways which require cleaning. The mushrooms are not picked in the growing rooms and hence, the growing rooms remain exceptionally clean.

We have found that the present invention can have a yearly production of about 2½ million pounds of mushrooms. This would involve 14 growing rooms such as the chamber 7 with 260 trays in each chamber. For harvesting, watering, and other processing steps, the trays are cycled about four times per week. In order to effect such scheduling, it is desirable to have one conveyor in the work area 14 for every four of the chambers 7.

Before the trays are inverted by the mechanism 116, they are preferably subjected to a cook out of several hours at temperatures up to 70°C. In order to prevent contamination of the working area 14, the enclosure 117 is preferably at a slight negative pressure. After the contents of the tray are dumped down a chute which may lead to a truck, the empty tray is put back on the conveyor 114 and transported to a cleaning area where it may be cleaned, refilled, and put into an empty pasteurization room. When the contents of the tray are being dumped down the chute by the invert mechanism 116, the lugs 130 prevent the tray from falling through the invert mechanism.

In a typical embodiment, the chambers 7 are 27 meters long, about 2 meters wide and about 4.3 meters high. The trays or receptacles for growing mushrooms are each about 1.75 meters wide and occupy 2.43 square meters. Each chamber contains 140 trays (10 stacks of 14) with a total bed space of 340 square meters. See FIGS. 1 and 7. The distance from wall 8 to a side face of stack 6 will be about 5 inches which is also the preferred distance between trays. These figures are by way of example rather than being limitations. For example, the chamber in FIG. 9 is twice the width of the chamber in FIG. 7.

In such an environment which is at least three times more compact than systems utilized heretofore, we grow 7.3 crops per year. Each crop has a high yield of hearty mushrooms. We have found that the air-conditioning as disclosed herein increases the yield by 20 percent and results in a more uniform size crop.

The present invention may be embodied in other specific forms without departing from the spirit or essential attributes thereof and, accordingly, reference should be made to the appended claims, rather than to the foregoing specification as indicating the scope of the invention.

We claim:

1. In an apparatus for cultivation of plants comprising an elongated enclosure of channel-shaped configuration having a pair of opposed upright walls which are generally parallel to each other, a stack of receptacles for respectively containing plants which are to be cultivated, said stack being disposed between said upright walls with the receptacles of said stack each having opposed side walls disposed generally parallel to but spaced from said upright walls, each receptacle having legs extending downwardly and resting on the next lower receptacle, each receptacle having a bottom wall spaced by said legs above the next lower receptacle, said opposed side walls of said receptacles defining with said upright walls of said enclosure first and second passages extending longitudinally of said upright walls and said side walls of said receptacles, a supply conduit communicating with said first passage for delivering air thereto, an exhaust conduit communicating with said second passage for withdrawing air therefrom, so that air introduced through said supply conduit will flow upwardly through said first passage and will be withdrawn through spaces beneath said bottom walls of said receptacles to said second passage from which the air is withdrawn by way of said exhaust conduit, so that air will be circulated uniformly through the enclosure with respect to plants in said receptacles with the bottom walls of the receptacles acting as a guide surface for guiding air from said first passage across the receptacles to the second passage.

2. In apparatus in accordance with claim 1 wherein said conduits are located at the same elevation adjacent one end of said stack.

3. In apparatus in accordance with claim 2 wherein said conduits are beneath the stack.

4. In apparatus in accordance with claim 3 wherein the stack is supported by a truck in the enclosure, with the truck being disposed above the elevation of said conduits.

5. In apparatus in accordance with claim 4 including a pair of rails in the enclosure extending generally parallel to said upright walls, said truck having wheels riding on said rails.

6. In apparatus in accordance with claim 5 wherein said rails are inclined so that the truck will roll from one end thereof toward the other under the effect of gravity.

7. In apparatus in accordance with claim 1 including a pair of said enclosures disposed one above the other with the upper enclosure spaced from the lower enclosure to define a work area between the elevations of the enclosures, said upper enclosure having a bottom wall formed with openings adjacent opposite ends thereof and communicating with the work area, said lower enclosure having a top wall formed with openings communicating with the work area adjacent opposite ends of the bottom enclosure.

8. In apparatus in accordance with claim 7 including gripping and elevating means associated with the openings at one end of the enclosures for moving receptacles from said one end of the enclosure to said work area, and a conveyor in said work area for receiving the receptacles and moving them to the opposite end of the enclosures.

9. In apparatus in accordance with claim 8 including a plurality of parallel upper enclosures, and a plurality of parallel lower enclosures, each enclosure being slightly wider than a whole number multiple of the width of the receptacles.

10. Apparatus for cultivating plants comprising a plurality of parallel channel-like chambers on one floor level, a plurality of aligned stacks of receptacles occupying substantially the entirety of each chamber, each stack including discrete receptacles spaced from and supported by the next lower receptacle, means for introducing preconditioned air into the chambers and withdrawing the air after it has moved through the space between adjacent receptacles, means defining an inlet for each chamber spaced from an outlet for each chamber, cycling means for selectively moving receptacles from a chamber outlet and returning the receptacles through said chamber inlet, said cycling means including elevator means and a conveyor, said conveyor being on a different floor level extending generally parallel to the chambers for supporting receptacles as the receptacles are moved from a chamber outlet to a chamber inlet, said elevator means being adapted to move receptacles from the first-mentioned floor level to the floor level of the conveyor and vice versa.

11. Apparatus in accordance with claim 10 wherein said elevator means includes a gripper means having an extended and a retracted position, said gripper means including elements for embracing and supporting a receptacle as the receptacle is moved in a generally vertical direction by elevator means.

12. Apparatus in accordance with claim 10 wherein the means for introducing and removing preconditioned air includes at least one inlet conduit and at least one exhaust conduit, said conduits being adjacent one another and adjacent one end of the stacks, said conduits extending parallel to upright walls defining said chambers, said upright walls being spaced from side faces of the stacks by a distance corresponding generally to the distance between adjacent receptacles in a single stack.

13. Apparatus in accordance with claim 12 wherein at least some of said chambers include first and second parallel rows of aligned stacks with first and second inlet conduits having the exhaust conduit disposed therebetween, said exhaust conduit being aligned with the space between the rows with the discharge ports on the inlet conduits being adjacent the upright walls defining the chamber.

14. Apparatus in accordance with claim 10 including an invert mechanism at said different floor level for inverting receptacles which have already been harvested, and a second conveyor for conveying receptacles to said invert mechanism.

15. Apparatus for cultivating plants comprising a multi-level building, a plurality of parallel chambers on one floor level of said building, a work area on a different floor level of said building, a conveyor on said different floor level extending generally parallel to said chambers, said conveyor being movable in a direction generally perpendicular to the length of said chambers so as to be vertically aligned with any particular one of said chambers, each chamber having an inlet which communicates with the floor level of the conveyor adjacent one end of the conveyor, each chamber having an outlet communicating with the floor level of the conveyor adjacent an opposite end of the conveyor, and elevating and gripping means for withdrawing receptacles containing plants from the chamber outlet and depositing the same on the conveyor, whereby receptacles may be cycled from a chamber across the conveyor for processing and then returned to the opposite end of the chamber from which they were withdrawn.

16. Apparatus in accordance with claim 15 including means for supporting and moving receptacles in the chamber in a direction from the inlet end to the outlet end of the chamber.

17. Apparatus in accordance with claim 16 wherein the elevator means is movable with the conveyor for selective use in connection with the outlet of a plurality of said chambers.

18. Apparatus in accordance with claim 16 wherein the chamber outlets are in a row and the chamber inlets being in a row, the row of inlets and outlets being parallel to one another.

* * * * *